United States Patent
Mochizuki et al.

(10) Patent No.: US 8,339,749 B2
(45) Date of Patent: Dec. 25, 2012

(54) PERPENDICULAR MAGNETIC RECORDING HEAD, MAGNETIC HEAD, AND MAGNETIC DISK DEVICE MOUNTED WITH THESE HEADS

(75) Inventors: Masafumi Mochizuki, Kanagawa-ken (JP); Hideaki Maeda, Kanagawa (JP); Shuji Nishida, Kanagawa (JP); Takaaki Izumida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 615 days.

(21) Appl. No.: 12/313,410

(22) Filed: Nov. 19, 2008

(65) Prior Publication Data

US 2009/0154012 A1 Jun. 18, 2009

(30) Foreign Application Priority Data

Dec. 14, 2007 (JP) .................................. 2007-323076

(51) Int. Cl.
*G02B 5/32* (2006.01)
*G02F 1/00* (2006.01)
(52) U.S. Cl. ................. 360/319; 360/123.46; 360/125.1; 360/123.12
(58) Field of Classification Search .................. 428/810, 428/811, 811.1, 811.5; 360/126, 123.11, 360/123.12, 123.13, 324.1, 324.2, 123, 125, 360/317, 125.1, 319, 321, 122, 125.17, 125.18, 360/125.19, 125.2, 125.21, 123.01, 123.46, 360/123.06, 125.62, 125.6, 125.7, 128.6
See application file for complete search history.

(56) References Cited

U.S. PATENT DOCUMENTS 4,656,546 A 4/1987 Mallory
(Continued)

FOREIGN PATENT DOCUMENTS

JP 11-250416 9/1999

OTHER PUBLICATIONS

JP 11-250416; Matsushita Yoshitomo et al; Sep. 1999; machine translation.*

(Continued)

*Primary Examiner* — Kevin Bernatz
*Assistant Examiner* — Louis Falasco

(57) ABSTRACT

Embodiments of the invention reduce generation of a magnetic field with a polarity reverse to that of the recording magnetic field, without deteriorating a gradient in the magnetic field. An embodiment of a magnetic disk device according to the present invention suppresses deviation and erase of already recorded data. In an embodiment, the perpendicular magnetic recording head includes the main magnetic pole, an auxiliary magnetic pole, a trailing shield disposed on the trailing side of the main magnetic pole with a non-magnetic film placed in-between, and side shields disposed on both the sides of the main magnetic pole in the direction of the track width with a non-magnetic film placed in-between. The trailing shield has on the trailing side a portion where film thickness is thinner on the trailing side than the thickness of its element in the height direction in its position facing the main magnetic pole. Adoption of this configuration allows suppression of generation of the magnetic field having a polarity reverse to that of the recording magnetic field, without deteriorating the magnetic field gradient. Also in the portion where the side shields face the main magnetic pole, the side shields have the portion where the film is thinned down in thickness.

18 Claims, 13 Drawing Sheets

U.S. PATENT DOCUMENTS

| | | | |
|---|---|---|---|
| RE33,949 E | 6/1992 | Mallary et al. | |
| 2002/0141118 A1* | 10/2002 | Nemoto | 360/319 |
| 2005/0088787 A1* | 4/2005 | Takahashi et al. | 360/324.2 |
| 2005/0141137 A1 | 6/2005 | Okada et al. | |
| 2006/0082924 A1* | 4/2006 | Etoh et al. | 360/125 |
| 2006/0158779 A1* | 7/2006 | Ota et al. | 360/126 |
| 2006/0158789 A1* | 7/2006 | Koyama et al. | 360/321 |
| 2007/0008649 A1* | 1/2007 | Sasaki et al. | 360/126 |
| 2007/0019327 A1 | 1/2007 | Maruyama et al. | |
| 2007/0030602 A1* | 2/2007 | Matono | 360/317 |
| 2007/0146929 A1* | 6/2007 | Maruyama et al. | 360/125 |
| 2007/0247747 A1* | 10/2007 | Benakli et al. | 360/125 |
| 2007/0247748 A1* | 10/2007 | Ikeda et al. | 360/126 |

OTHER PUBLICATIONS

Mallary et al. "One Terabit per Square Inch Perpendicular Recording Conceptual Design" IEEE Transactions on Magnetics, vol. 38, No. 4, pp. 1719-1724 (Jul. 2002).

* cited by examiner

Fig. 1
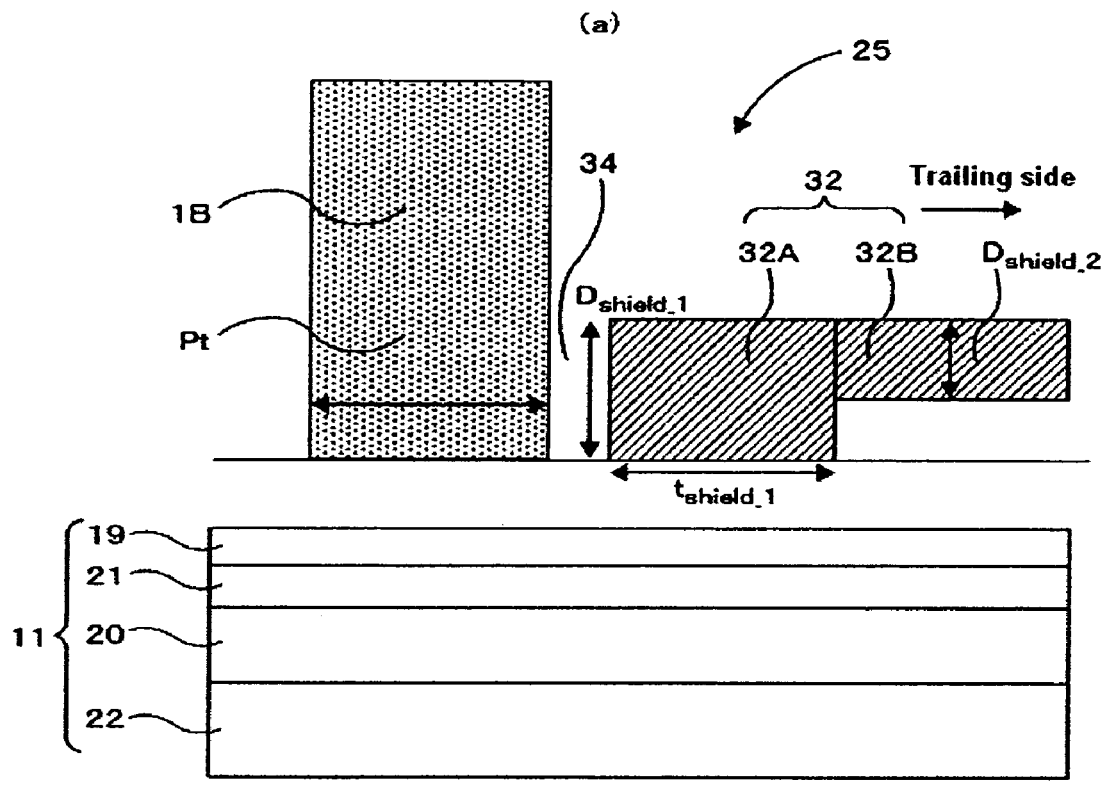
(a)
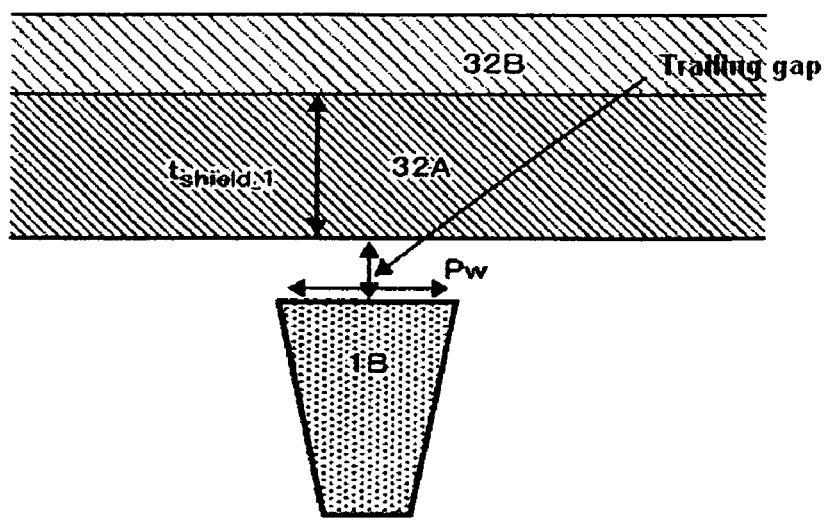
(b)

Fig.3
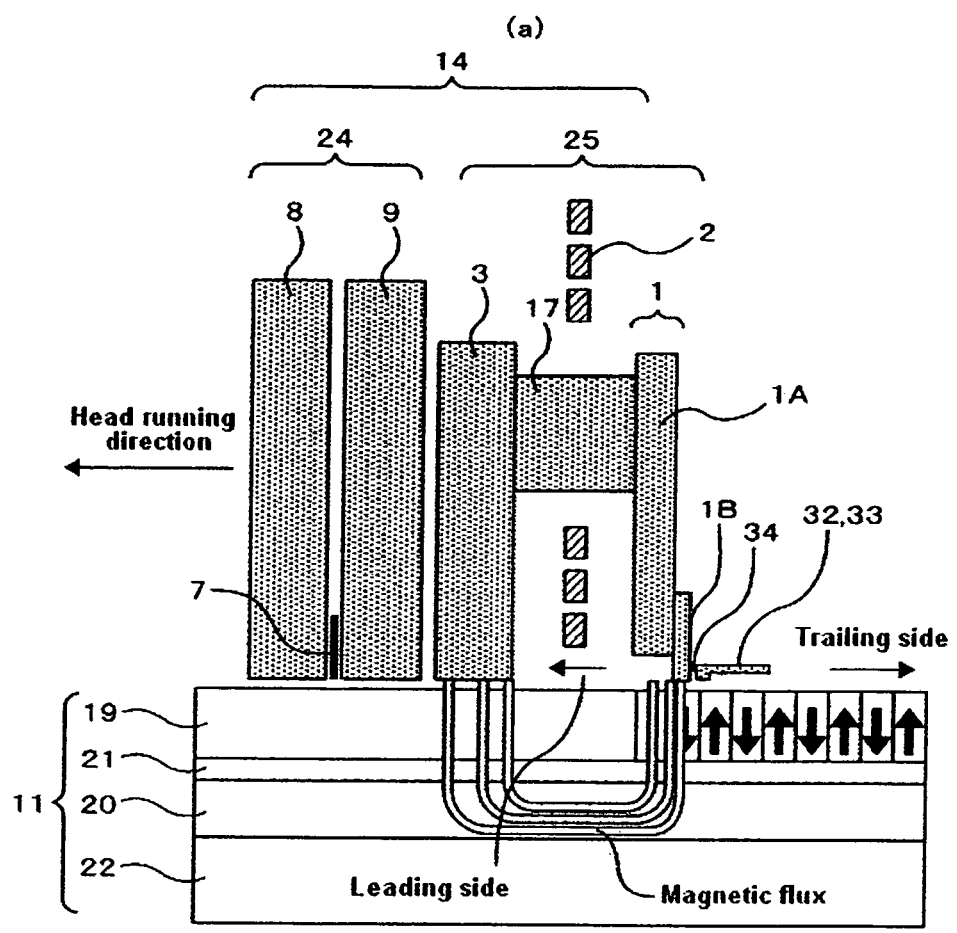
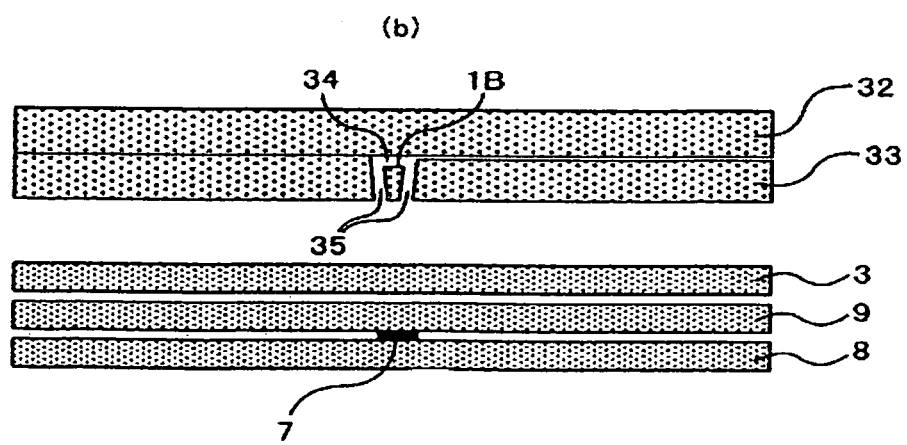

Fig.8
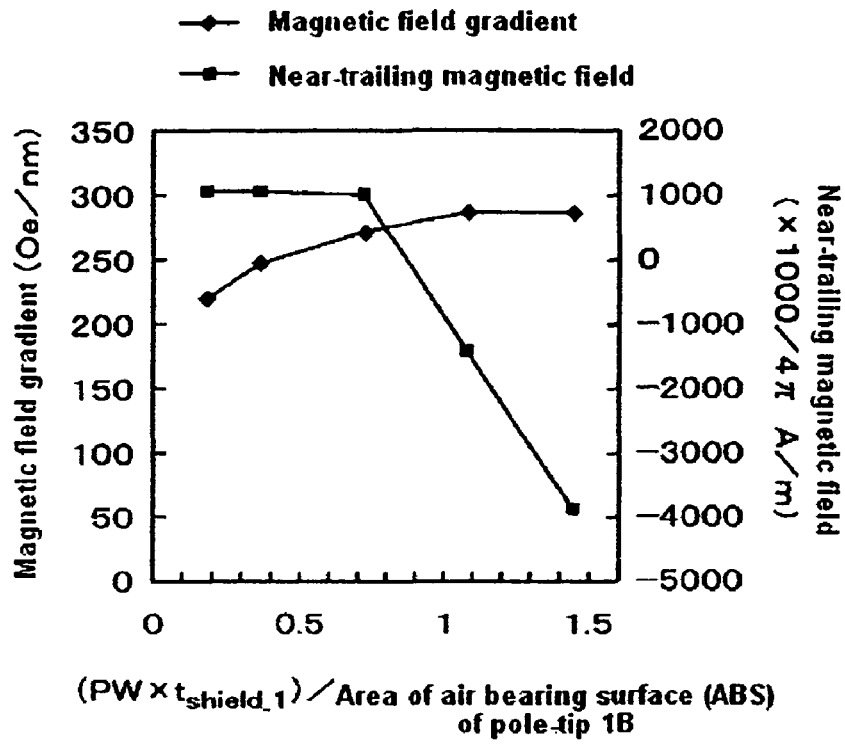
$(PW \times t_{shield\_1})$/Area of air bearing surface (ABS) of pole-tip 1B
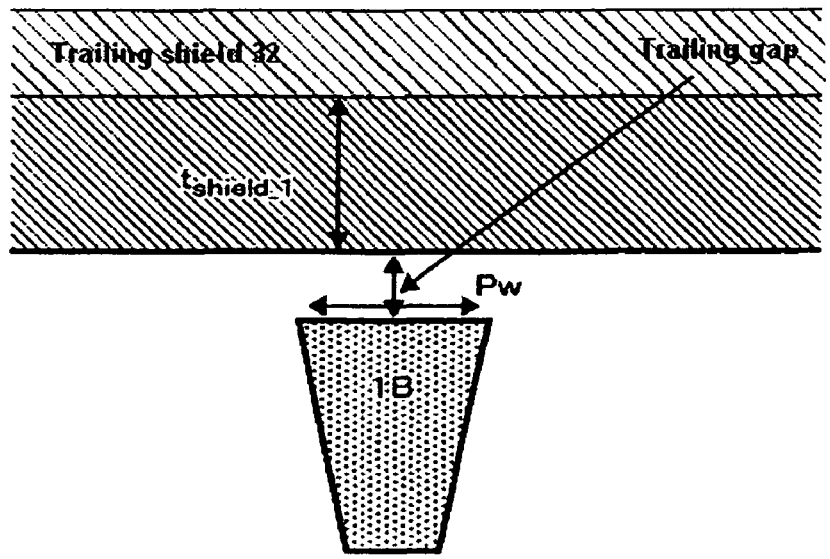

Fig.11
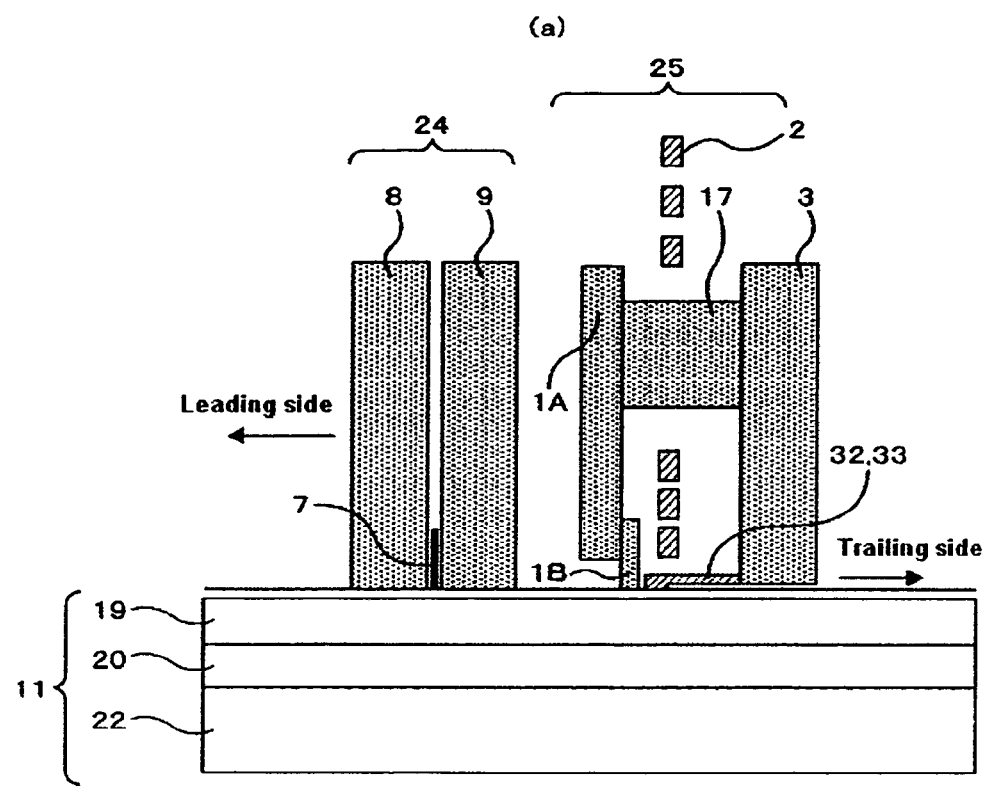
(a)
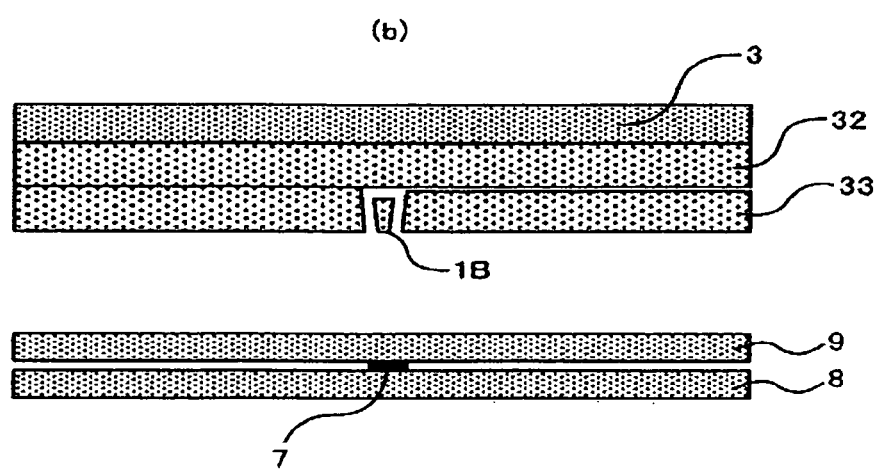
(b)

Fig. 13
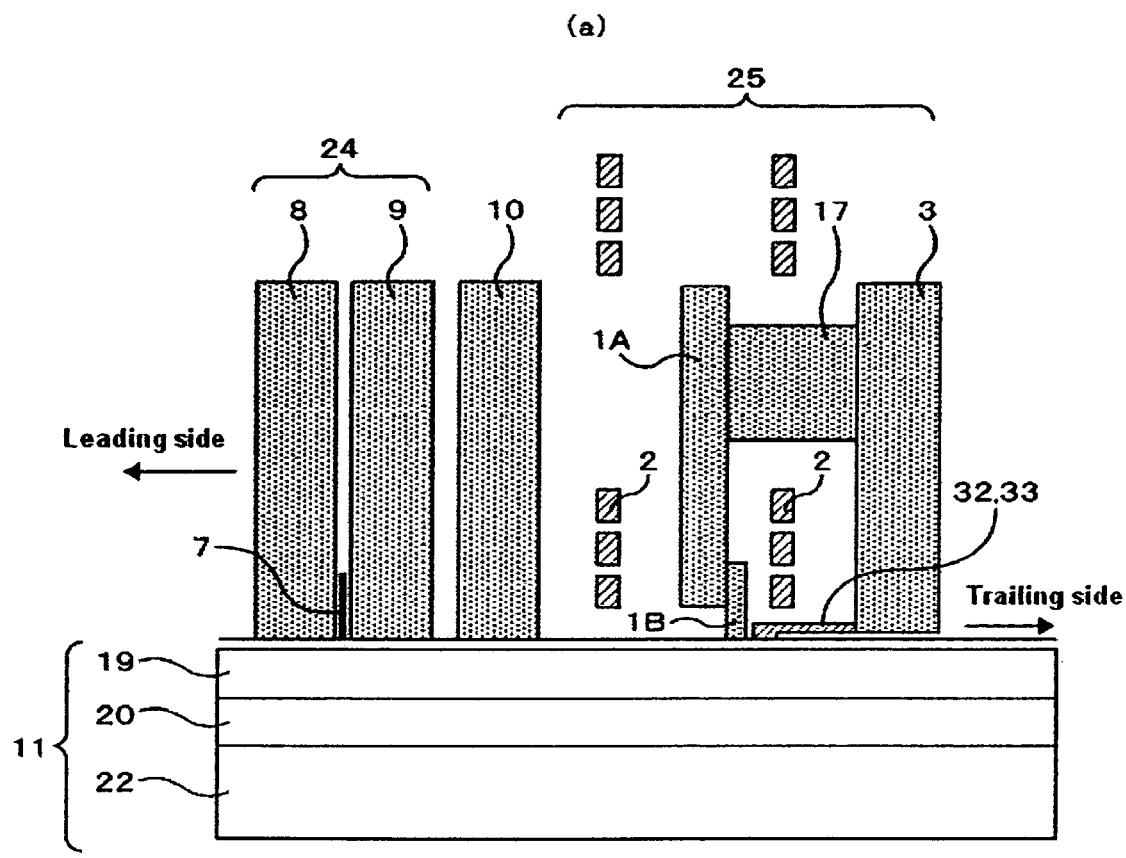
(a)
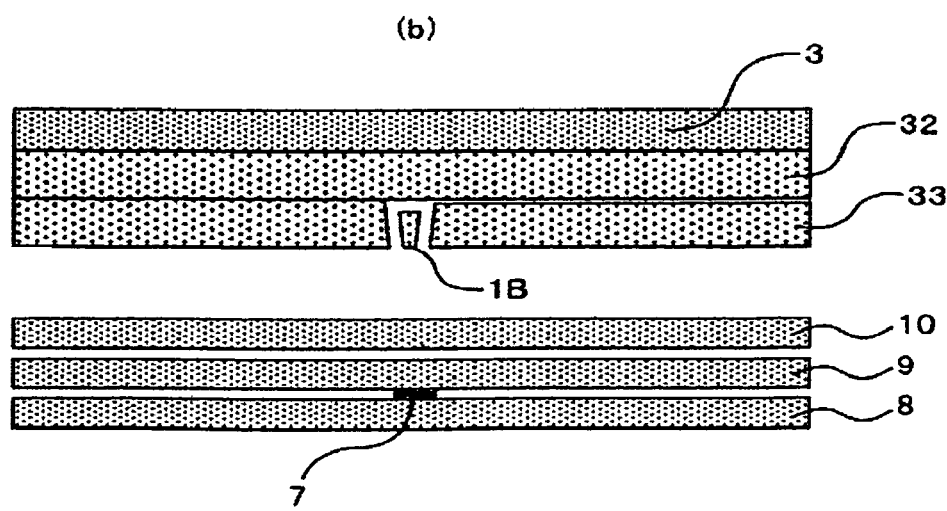
(b)

PERPENDICULAR MAGNETIC RECORDING HEAD, MAGNETIC HEAD, AND MAGNETIC DISK DEVICE MOUNTED WITH THESE HEADS

CROSS-REFERENCE TO RELATED APPLICATION

The instant nonprovisional patent application claims priority to Japanese Patent Application No. 2007-323076, filed Dec. 14, 2007 and which is incorporated by reference in its entirety herein for all purposes.

BACKGROUND OF THE INVENTION

A magnetic recording and reproducing device is mounted with a magnetic recording medium and a magnetic head, and the data on the magnetic recording medium is written in or read out by means of the magnetic head. To increase recording capacity for a unit area of the magnetic recording medium, it is necessary to increase areal recording density. However, when the bit length to be recorded becomes small, the longitudinal magnetic recording system currently practiced is apt to cause the problem of thermal fluctuation in magnetization, leading to another problem that the longitudinal recording density cannot be increased.

As a solution to the above problem, there is a perpendicular recording system in which magnetizing signal is recorded with a magnetic monopole head in the perpendicular direction onto a double-layer perpendicular medium with a soft under layer. This system makes it possible to apply a stronger recording magnetic field to a medium. Accordingly, the recording layer that has a large magnetic anisotropy constant can be used. Also, the magnetic recording medium for the perpendicular recording system has a merit in that, by making magnetic layer thicken, it becomes possible to enlarge cubic content while keeping the grain diameter appearing on the surface of the medium as small as is, that is, keeping the bit length as small as is. Further, in the perpendicular magnetic recording, record magnetization formed in the medium is kept in the direction perpendicular to the film surface, which is advantageous to stably holding record magnetization recorded in high density. With a view to enhancement of longitudinal recording density of the magnetic recording device, this perpendicular magnetic recording system is getting into wider use in place of the conventional longitudinal magnetic recording system. For the perpendicular magnetic recording, the magnetic head used for recording and reproducing is of a type of separated heads respectively for recording and reproducing. For the reproducing head, a magnetoresistance effect type head similar to the one used for conventional longitudinal magnetic recording is used, and for the recording head, a magnetic monopole head including a main magnetic pole and an auxiliary magnetic pole may be used.

In the perpendicular magnetic recording system, demand for making steeper the recording magnetic field generated by the magnetic head has arisen in order to enhance the recording characteristics such as resolution power and S/N ratio and thereby to improve track recording density and track density. However, since the magnetic flux from the main magnetic pole spreads out spatially according to the distance from the main magnetic pole, there has been a problem that the magnetic field gradient necessary for recording becomes small. Also, as the magnetic field affects adjacent tracks too, it has been regarded a problem that the data recorded in the adjacent tracks are apt to get deleted. Though effective remedy is to reduce the distance between the main pole and the medium, it is necessary on the other hand to retain a certain necessary clearance between the main pole and the medium to avoid contact with each other.

To solve the above problem, M. Mallary IEEE Trans. Magn., vol 38 pp 1719-1724 (2002) ("Non-patent Document 1") discloses a so-called shield type magnetic monopole head in which a shield is disposed so as to absorb magnetic flux derived from the side on the trailing side of the main magnetic pole. Such shield is described as being able to make steep the head magnetic field relating to recording. Also disclosed in U.S. Pat. No. 4,656,546 ("Patent Document 1") and Japanese Unexamined Patent Application Publication No. 2005-190518 ("Patent Document 2") is a shield type magnetic head in which an additional shield is provided to absorb magnetic flux leaking out from the main magnetic pole to the adjacent track side. The use of this head may reduce the magnetic field charged to the adjacent tracks in the recording process.

BRIEF SUMMARY OF THE INVENTION

Embodiments of the invention reduce generation of a magnetic field with a polarity reverse to that of the recording magnetic field, without deteriorating a gradient in the magnetic field. An embodiment of a magnetic disk device according to the present invention suppresses deviation and erase of already recorded data. In an embodiment, the perpendicular magnetic recording head includes the main magnetic pole, an auxiliary magnetic pole, a trailing shield disposed on the trailing side of the main magnetic pole with a non-magnetic film placed in-between, and side shields disposed on both the sides of the main magnetic pole in the direction of the track width with a non-magnetic film placed in-between. The trailing shield has on the trailing side a portion where film thickness is thinner on the trailing side than the thickness of its element in the height direction in its position facing the main magnetic pole. Adoption of this configuration allows suppression of generation of the magnetic field having a polarity reverse to that of the recording magnetic field, without deteriorating the magnetic field gradient.

BRIEF DESCRIPTION OF THE DRAWINGS

FIG. 1(a) is an exemplary cross-sectional pattern diagram of the perpendicular magnetic recording head according to an embodiment being shown at the center of the track.

FIG. 1(b) is an exemplary pattern diagram of an example of magnetic recording medium looked down from the ABS of the recording head.

FIG. 3(a) is an exemplary schematic pattern diagram showing the magnetic head according to an embodiment being shown at the center of the track, and FIG. 3(b) is a top view of the magnetic disk looked down from the ABS.

FIG. 8 shows the result of calculation on the three-dimensional magnetic field of the perpendicular magnetic recording head in relation to an embodiment.

FIG. 11 includes (a) an exemplary cross-sectional schematic pattern diagram at the center of the track and (b) an exemplary schematic pattern top view looked down from the ABS, both showing an example of modification on the magnetic head shown in FIG. 3.

FIG. 13 includes (a) an exemplary cross-sectional schematic pattern diagram at the center of the track and (b) an exemplary schematic pattern top view looked down from the ABS, both showing an example of modification on the magnetic head shown in FIG. 3.

DETAILED DESCRIPTION OF THE INVENTION

Embodiments of the present invention relate to a perpendicular magnetic recording head, a magnetic head including a recording element and a reproducing element, and a magnetic disk device mounted with these heads, and in particular, to a magnetic head for the perpendicular magnetic recording having a shield around a main pole of the recording element and a magnetic disk device mounted with such magnetic head.

Figure 4A:
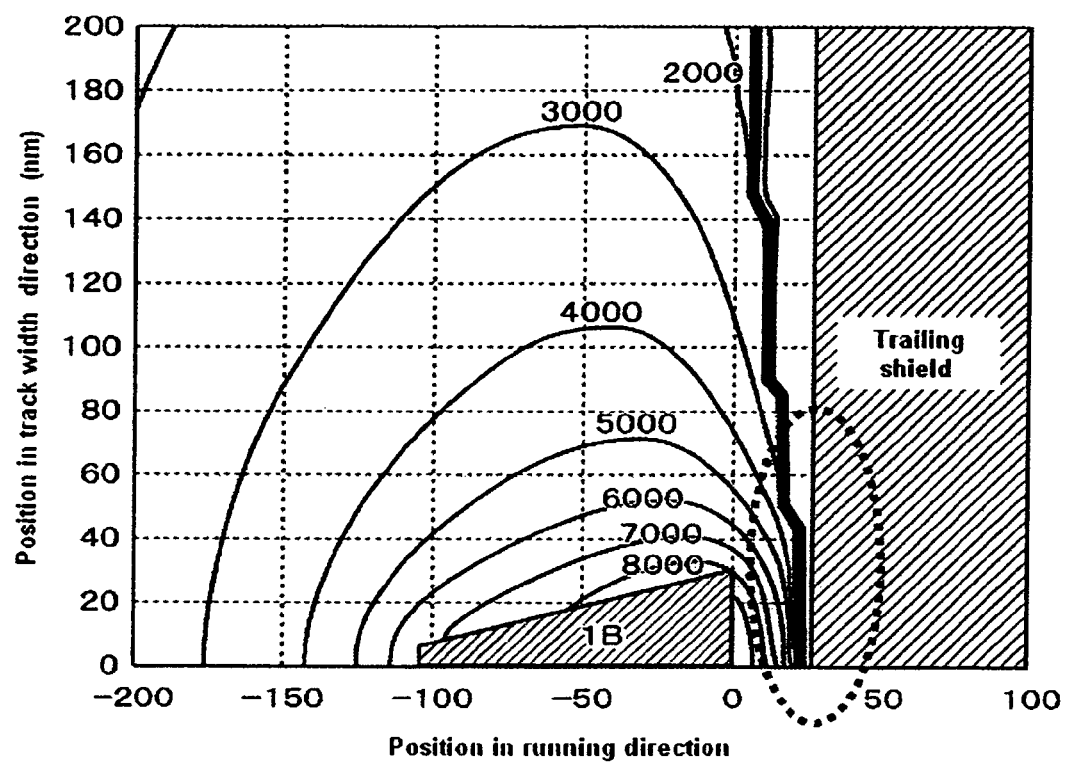
FIG. 4A shows an example of isomagnetic field curves of the recording magnetic field in relation to embodiments of the present invention.
Figure 4B:
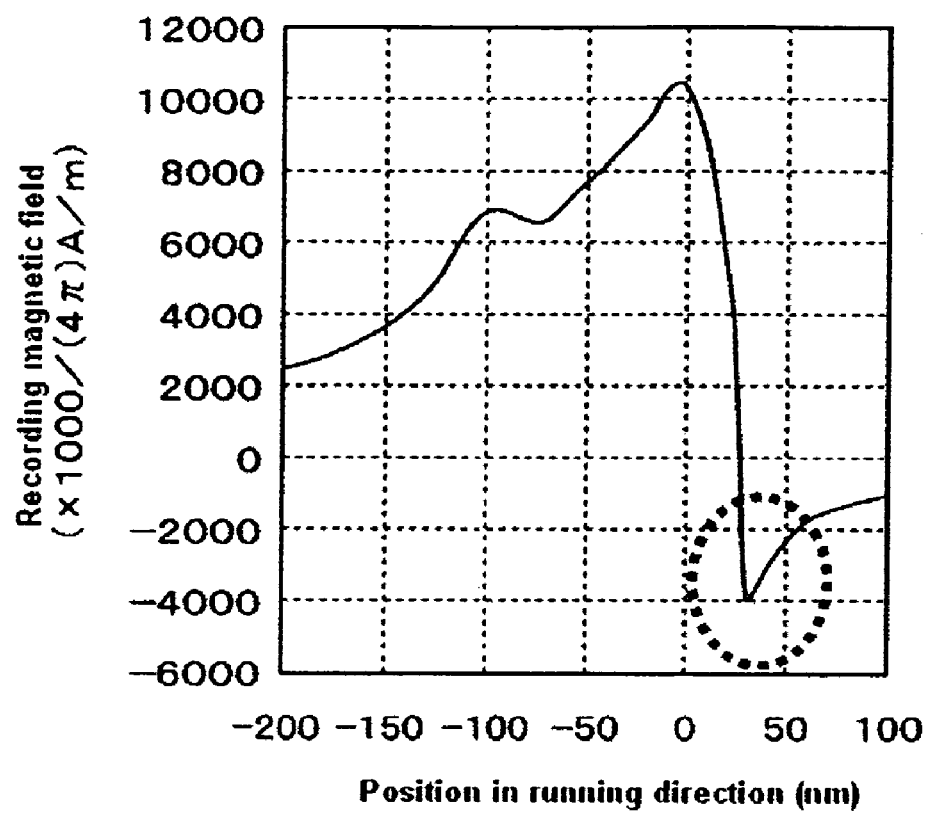
FIG. 4B shows the exemplary distribution curve of the recording magnetic field in the running direction at the track center.

As mentioned above, the shield type magnetic head is characterized as being able to make the magnetic field gradient steep. However, as the amount of magnetic flux to be absorbed into the shield to keep the steepness of the magnetic field gradient grows larger, the tendency will grow stronger that the magnetic-field component increases in the surface direction and that the magnetic field having a polarity reverse to that of the recording magnetic field is generated. Magnetic field of such reverse polarity has likelihood of causing deterioration and deletion of existing recorded data. FIG. 4A shows an example of isomagnetic field curves of the recording magnetic field obtained from three-dimensional magnetic field calculation. The model covered in FIG. 4A shows only the half side of the track center of the main magnetic pole 1B with a trailing shield but without a side shield. Shown in FIG. 4B is the distribution of the recording magnetic field in the running direction in the track center. In the portion circled with a short dashed line, it is clear that the magnetic field having a polarity reverse to that of the recording magnetic field is generated. In the case of a head provided with a side shield, it may also happen that the magnetic field of reverse polarity is generated even in the position opposed to the side shield.

Consequently, embodiments of the present invention suppress generation of the magnetic field having a polarity reverse to that of the recording magnetic field, without deteriorating the magnetic field gradient of the perpendicular magnetic recording head. Embodiments of the present invention also solve the problem that the recording magnetic field from the main magnetic pole may leak to the already recorded data and may damp or delete such data.

A representative perpendicular magnetic recording head according to an embodiment of the present invention is characterized in that the head includes a main magnetic pole, an auxiliary magnetic pole, and a trailing shield of magnetic substance disposed on the trailing side of the main magnetic pole with a non-magnetic film placed in-between and that the trailing shield has a portion where the film is thinner on the trailing side than the thickness of its element in the height direction in its position facing the main magnetic pole. By adopting the above structure, it becomes possible to suppress generation of the magnetic field having a polarity reverse to that of the recording magnetic field, without deteriorating the magnetic field gradient.

The above portion of the trailing shield where the film is thinner in thickness may be recessed to above the air bearing surface (ABS) of the head. In this manner, it is possible to more effectively suppress generation of the magnetic field having a polarity reversed relative to that of the recording magnetic field, without deteriorating the magnetic field gradient.

A representative magnetic disk device according to an embodiment of the present invention may be characterized in that the device includes the perpendicular magnetic recording head having the above recording head and the reproducing head, the latter being disposed on the leading side of the recording head, and a perpendicular magnetic recording disk having a magnetic recording layer and a lining layer of soft magnetism above a substrate.

According to an embodiment of the present invention, it is possible to suppress generation of the magnetic field having a polarity reverse to that of the recording magnetic field, without deteriorating the magnetic field gradient of the perpendicular magnetic recording head. Also, mounting of the perpendicular magnetic recording head enables prevention of already recorded magnetization data from deterioration or deletion, forming the basis of a highly reliable magnetic disk device suitable for high-density recording which the present invention intends to provide.

Hereafter, explanation is given in detail of the perpendicular magnetic recording head, the magnetic head, and the magnetic disk device in reference to drawings. As the same reference letters and/or numerals are used for the same elements in each drawing, duplicated explanations are omitted, if necessary to make the explanation clear.

Figure 2:
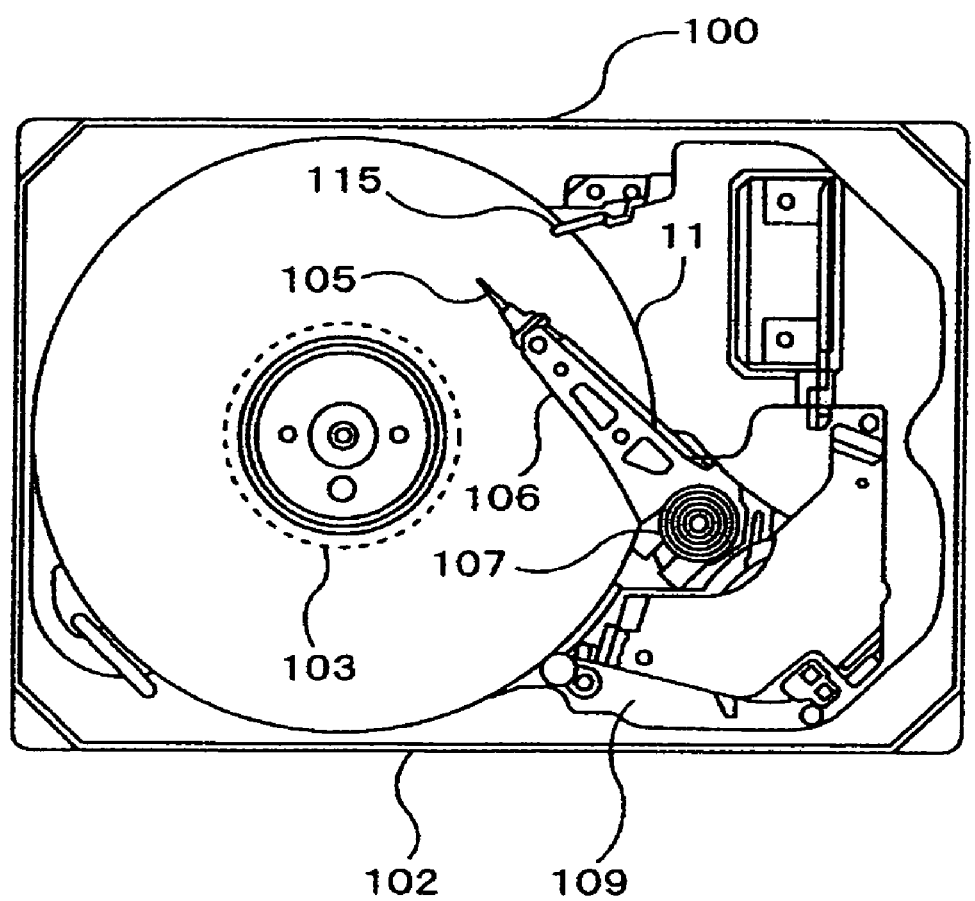
FIG. 2 is an exemplary schematic top view of a magnetic disk device (HDD) showing the overall configuration of the device.

FIG. 2 is a top view of a magnetic disk device (HDD) with its top cover of the case removed. The HDD 100 is provided with the magnetic disk 11, the medium to record data. The magnetic disk 11 includes a recording layer and a lining layer of soft magnetism. The head slider 105 includes the magnetic head which writes in and/or read out to and/or from the magnetic disk 11 the data inputted and/or outputted to and/or from an external host device (not shown in the drawing) and the slider on the surface of which the magnetic head is formed. The magnetic head has a recording element (a perpendicular magnetic recording head) which converts electrical signals to magnetic field according to the memory data given to the magnetic disk 11 and a reproducing element (a reproducing head) which converts the magnetic field from the magnetic disk 11 to electrical signals. The structure of the magnetic head is to be described in detail later.

The actuator 106 retains and moves the head slider 105. The actuator 106 is turnably supported on the turnable shaft 107 and driven by the voice coil motor (to be abbreviated as "VCM" hereafter) 109. The assembly of the actuator 106 and the VCM 109 is a migratory mechanism for the head slider 105. The magnetic disk 11 is held on the spindle motor (to be abbreviated as "SPM" hereafter) 103 which is fixed on the base 102 and rotated by the SPM 103 at a predetermined angular speed.

To read and/or write data from/to the magnetic disk 11, the head slider 105 is relocated in the air over the data region on the surface of the rotating magnetic disk 11 by means of the actuator 106. When the pressure occurring from the aerial viscous behavior generated between the ABS (Air Bearing Surface) of the head slider 105 opposed to the magnetic disk 11 and the rotating magnetic disk 11 balances with the pressure added by the actuator 106 toward the magnetic disk 11, the head slider 105 stays floating over the magnetic disk 11 with a certain gap in-between.

At the time when the magnetic disk 11 stops rotation, for example, the actuator 106 makes the head slider 105 retire from the data region to the ramp 115. The movements of each of the above constituent elements are controlled by the control circuit on the control circuit board (not shown in the drawing). This system is also adaptable to the CSS (Contact Start and Stop) system in which the head slider 105 may take shelter in the zone placed along the inner circumference of the magnetic disk 11, if the head slider 105 is not in processing of writing and/or reading data. The above explanation is made, for the sake of simplification, on the assumption that the magnetic disk 11 is comprises one sheet of single-sided recording type. However, the HDD 100 in actuality may comprise one or a plurality of sheets of double-sided recording type magnetic disks.

FIG. 3(a) is a schematic diagram showing the relation between the magnetic head 14 and the magnetic disk 11, and the outline of perpendicular recording. FIG. 3(b) is a top view looked down from the ABS. The magnetic head 14 comprises, in the order viewed from the side of the moving direction of the head (the leading side), the lower shield 8, the reproducing element 7, the upper shield 9, the auxiliary magnetic pole 3, the thin-film coil 2, and the main magnetic pole 1. The lower shield 8, the reproducing element 7, and the upper shield 9 comprise the reproducing head 24; and the auxiliary magnetic pole 3, the thin-film coil 2, and the main magnetic pole 1 comprise the perpendicular magnetic recording head (magnetic monopole head) 25.

The main magnetic pole 1 is comprised of the main magnetic pole yoke part 1A which is connected with the auxiliary magnetic pole 3 via the pillar 17 and the main magnetic pole pole-tip 1B on the air bearing surface to determine the track width. On the trailing side of the main magnetic pole, the trailing shield 32 is disposed with a non-magnetic film (trailing gap) 34 placed in-between. In addition, on both the sides of the main magnetic pole 1 in the direction of the track width, the side shield 33 is disposed with a non-magnetic film (side gap) 35 placed in-between.

As shown in FIG. 3(b), the main magnetic pole pole-tip 1B is axisymmetrical in the direction of the track width and is in a shape of trapezoid with its width in the leading part being narrower than its width in the trailing part. This design has been adopted in order to prevent the data in the adjacent tracks from being deleted or deviated by the effect of the magnetic field in the leading part of the main magnetic pole pole-tip 1B, if a skew angle exists between the magnetic head 14 and the track.

In the example shown in FIG. 3(b), the side shield 33 is formed so as to conform to the bevel angle of the main magnetic pole pole-tip 1B, and the shape of the side shield 33 is thus in conformity to the shape of the main magnetic pole pole-tip 1B.

The magnetic disk medium 11 comprises soft under layer 20, the intermediate layer 21 including Ru, etc., and the magnetic recording layer 19, these layers being laminated on the substrate 22. As for the materials of the soft under layer 20, those of large saturation magnetic flux density include FeCo series, FeCoB, FeCoV, FeSi, FeSiB—C, etc., while those of smaller saturation magnetic flux density include CoTaZr, CoZrNb, FeNi, FeCr, NiFeO, AlFeSi, NiTaZr, etc., as examples. As the materials for the recording layer 19, examples may be listed as a granular film of $CoCrPt—SiO_2$, FePt ordered alloy, Co/Pd, Co/Pt lattice film, TbFeCo amorphous film, etc.

The magnetic flux generated from the main magnetic pole 1 of the perpendicular magnetic recording head 25 forms a magnetic circuit passing through the magnetic recording layer 19 of the magnetic disk medium 11, the intermediate layer 21, and the lining layer of soft magnetism 20 until it enters the auxiliary magnetic pole 3, while it has its magnetization patterns recorded in the magnetic recording layer 19. Between the magnetic recording layer 19 and the lining layer of soft magnetism 20, the intermediate layer 21 of Ru or other material is formed, but it may be omitted. The giant magnetoresistance effect element (GMR), the tunnel magnetoresistive effect element (TMR), etc., are employed comprising the reproducing element 7 of the reproducing head 24.

FIG. 1(a) is a schematic cross-sectional view of the main magnetic pole pole-tip 1B in its apical end and the trailing shield 32 in its track center, both of which are the parts of the above perpendicular magnetic recording head 25. FIG. 1(b) is a view seen from the side of the air bearing surface (ABS), showing only the proximity to the main magnetic pole. As shown in FIG. 1, the magnetic head 14 relating to the present embodiment is characterized in that it has the portion 32A where the trailing shield 32 is opposed to the main magnetic pole pole-tip 1B and the portion 32B immediately in its back (on the trailing side) and that the film thickness of the portion 32B is smaller than the heightwise thickness $Dshield\_1$ of the element of the portion 32A. That is, there are portions which satisfy the relation of $Dshield\_1 > Dshield\_2$. With the above structure, it is possible to control the magnetic flux flowing into the trailing shield 32. Also, it becomes possible to prevent the magnetic flux in a position away from the trailing gap 34 from returning to the trailing shield 32B. By mounting the magnetic head 14 of such structure on the magnetic disk device 100, it becomes possible to suppress the magnetic field intensity of the polarity reverse to that of the recording magnetic field charged to the track in which some magnetization data has already been recorded, resulting in realization of a high-density magnetic disk device of high reliability.

The magnetic field intensity generated from the main magnetic pole 1 of the perpendicular magnetic recording head 25 according to the embodiment shown in FIG. 1, was calculated by three-dimensional magnetic field calculation. In this regard, assumptions were made as follows: the thickness of the lining layer of soft magnetization 20 was set to 20 nm; the thickness of the trailing shield 32 was 50 nm; and the distance between the main magnetic pole pole-tip 1B and the trailing shield 32 was 27 nm.

Other conditions for calculation were as follows. The width Pw of the main magnetic pole pole-tip 1B was 50 nm; the apical end of the main magnetic pole pole-tip 1B was given an angle of 8 degrees so as to form a shape of trapezoid which was narrower in the leading portion; the film thickness was made 106 nm. The material of the main magnetic pole pole-tip 1B was assumed to be CoNiFe with a saturation flux density of 2.4 T and a relative magnetic permeability of 500. The yoke part 1A of the main magnetic pole 1 was assumed to comprise 80 at % of Ni and 20 at % of Fe. As to the auxiliary magnetic pole 3, it was assumed that the material was to have a saturation flux density of 1.0 T, a width of 30 μm in the direction of the track width, a length of 16 μm in the direction of height of the element, and a film thickness of 2 μm.

For the upper shield 9 and the lower shield 8, it was assumed that the material was to have a composition of 80 at % of Ni and 20 at % of Fe with a saturation flux density of 1.0 T, a width of 32 μm in the direction of the track width, a length of 16 μm in the direction of height of the element, and a film thickness of 1.5 μm. The trailing shield 32 was assumed to comprise 45 at % of Ni and 55 at % of Fe with a saturation flux density of 1.7 T and a relative magnetic permeability of 1000. It was also assumed to be 35 mA as a value of recording current and 5 turns as a number of turns of the coil.

As to the lining layer of soft magnetism 20 for the magnetic disk medium 11, its material was assumed to be one with saturation flux density of 1.35 T. The lining layer of soft magnetism 20 was assumed to have a film thickness of 20 nm. As for the magnetic recording layer 19, only a film thickness of 16 nm was taken into consideration. The intermediate layer 21 was assumed to have a thickness of 15.5 nm, and the distance from the magnetic head 14 to the surface of the magnetic recording layer 19 was assumed to be 8.5 nm. Accordingly, the distance from the magnetic head 14 to the surface of the lining layer of soft magnetism 20 was assumed to be 40 nm. The recording magnetic field was calculated on the assumption that the center position of the magnetic recording layer 19 was located 16.5 nm away from the air bearing surface of the head.

Incidentally, the recording magnetic field was calculated based on the concept of Stoner Wohlfarth; namely, it was shown as a combination of perpendicular component of field and longitudinal component of field considering the angle of the recording magnetic field, in accordance with the formula (1) below:

$$|H| \cdot \left( \sin(\theta) \frac{1}{nSW} + \cos(\theta) \frac{1}{nSW} \right)^{nSW} \quad (1)$$

In the above formula, H is a norm of the perpendicular component, the down-track component, and the track-width directional component of the magnetic field; θ is an angle of the magnetic field in the direction perpendicular to the surface; and nSW is a coefficient of Stoner Wohlfarth which, normally, is 3/2. Present calculation was made on the assumption that the coefficient was to be 1 in consideration of the characteristic of the medium. Effective magnetic field increases when there is increase in the longitudinal component of magnetic field (the down-track component and the truck-width directional component), resulting in increased intensity of the magnetic field of reverse polarity. Therefore, it also becomes important to decrease the longitudinal component of magnetic field in order to prevent erase of recorded data.

Figure 5:
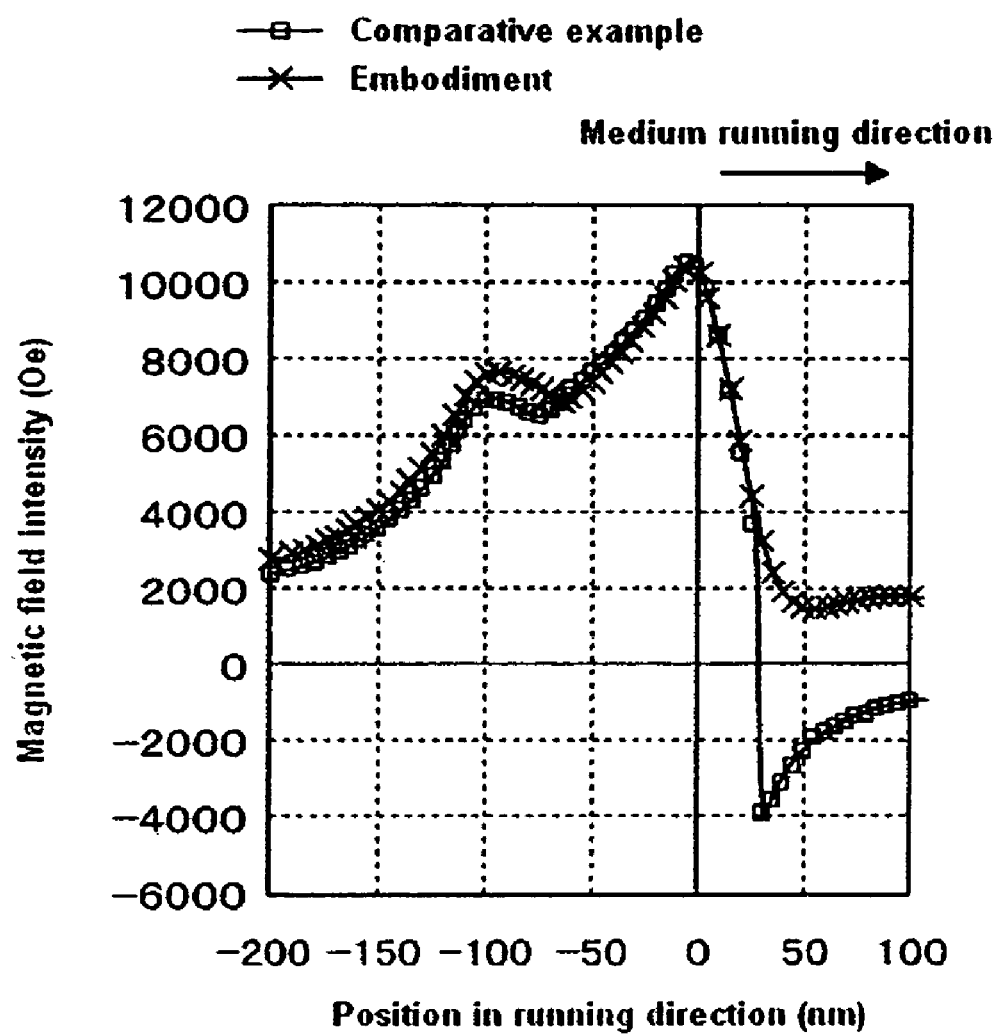
FIG. 5 shows the exemplary distribution curves of the recording magnetic field in the running direction at the track center, of the perpendicular magnetic recording head in relation to an embodiment.

In FIG. 5, the magnetic field intensity distribution on a computational basis is shown with respect to the main magnetic pole pole-tip 1B in the center of the track in the down-track direction. The graph in FIG. 5 indicates that, on the trailing side, the magnetic head according to an embodiment has not generated a magnetic field the polarity of which is reverse to that of the magnetic field immediately below the main magnetic pole, unlike the comparative example which has no variance in film thickness of the trailing shield. The foregoing has been realized because the magnetic flux flow is controlled by providing the portion which satisfies the relation of $D_{shield\_1} > D_{shield\_2}$. Also, any large variance (deterioration) is not observed in regard to the maximum magnetic field intensity and the gradient, or slope, in the magnetic field around 8000 (×1000/(4π) A/m) on the trailing side.

Figure 6:
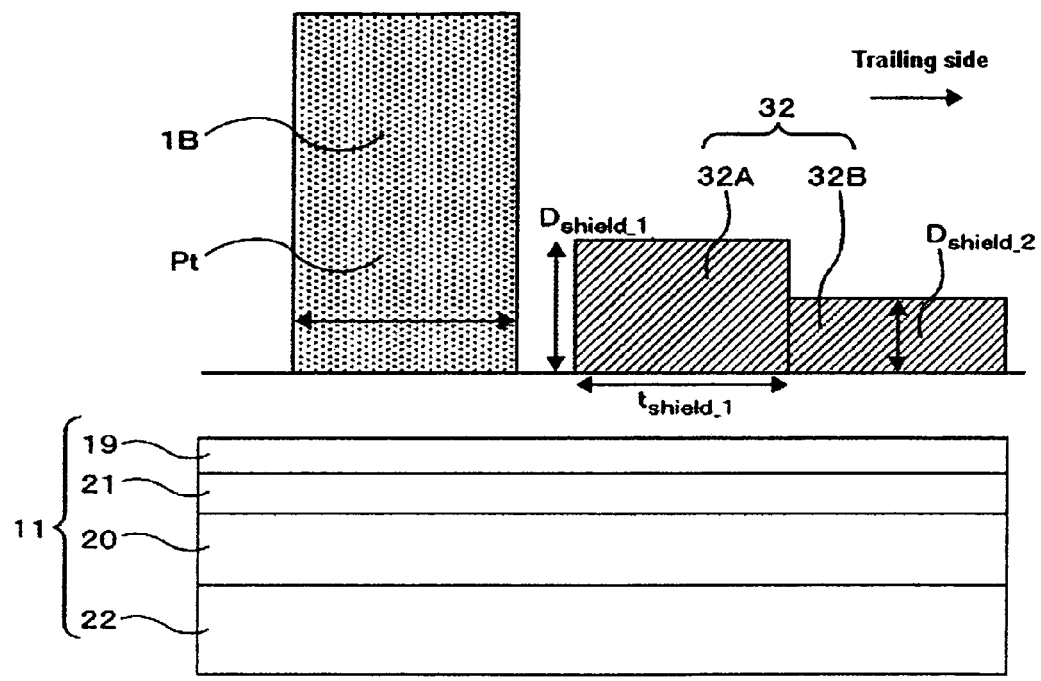
FIG. 6 is an exemplary cross-sectional schematic pattern diagram showing another modified example of the perpendicular magnetic recording head shown in FIG. 1.

To vary the film thickness of the trailing shield 32, the portion 32B where the film is thinner in thickness may be recessed from the air bearing surface level as shown in FIG. 1(a). In that manner, the distance from the lining layer of soft magnetism 20 to the surface of the portion 32 with a thinner film thickness may be kept large. Of course, the structure as shown in FIG. 6, in which the opposite side of the air bearing surface is recessed, may be practicable as well. Adopting such a structure enables prevention of magnetic flux from returning to the trailing shield 32 in a position distant from the trailing gap 34.

Figure 7:
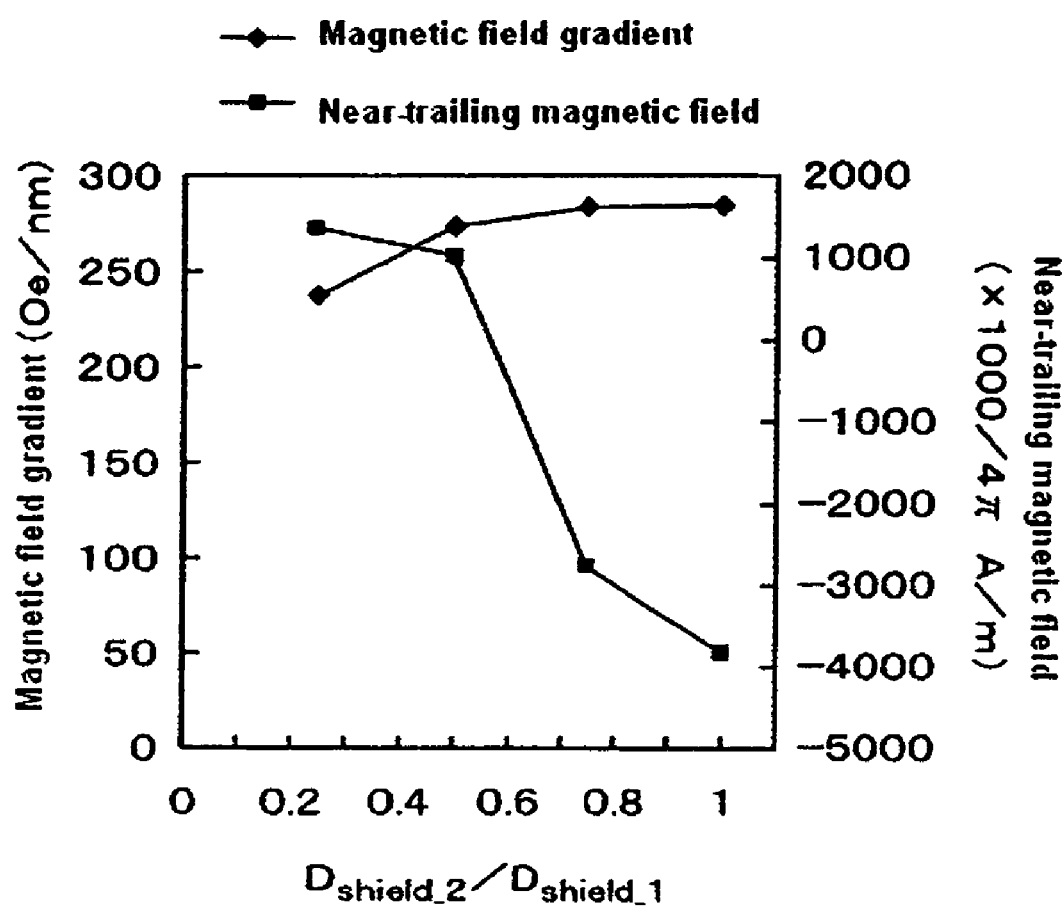
FIG. 7 shows the result of calculation on the three-dimensional magnetic field of the perpendicular magnetic recording head in relation to an embodiment.

FIG. 7 shows dependency on $D_{shield\_2}$ of the gradient in the magnetic field. FIG. 7 was calculated in the same manner as for FIG. 5, except for the calculation conditions for $D_{shield\_2}$. The horizontal axis stands for the ratio of $D_{shield\_2}$ against $D_{shield\_1}$ ($D_{shield\_2}/D_{shield\_1}$) The value 1 on the horizontal axis indicates no change for the film thickness of the conventional structure. As the value on the horizontal axis becomes smaller, the magnetic field of negative values (the right axis) turns to the positive side. That happens because $D_{shield\_2}$ is reduced in thickness, thereby making the amount of suction of magnetic flux smaller. The gradient in the magnetic field (the left axis) is to decrease, but overall decrease is to be 20% approximately. The gradient in the magnetic field will show little decrease without existence of magnetic field of the reverse polarity (negative magnetic field) in the vicinity of $D_{shield\_2}/D_{shield\_1} = 0.6$ calculated at the level of 8000 (×1000/4π(A/m)) assuming the coercivity of the medium of the recording frequency. Therefore, by adopting the structure as represented by $D_{shield\_2}/D_{shield} < 0.6$, embodiments of the present invention may realize all the better the perpendicular magnetic recording head that enables prevention of erase and deviation of any previously recorded magnetization data.

For instance, assume a case, in FIG. 7, of $D_{shield\_2}/D_{shield\_1} = 25$ nm/50 nm=0.5, and it will be found that the magnetic field of the reverse polarity (negative magnetic field) no longer exists. But, when the trailing shield 32 was made as thin as 25 nm without any change in terms of film thickness, the magnetic field of reverse polarity (negative) still existed. This is the effect brought about by putting the structure of the embodiment in FIG. 1 and FIG. 6 into practice, and varying the film thickness of the trailing shield so that magnetic flux may not be absorbed into the thinner portion 32B.

Additionally, FIG. 8 indicates the dependency on $t_{shield\_1}$ of the gradient in the magnetic field. The computational conditions for FIG. 8 were made to remain the same as for FIG. 5 except for those for $t_{shield\_1}$.

The horizontal axis is indicative of the ratio of Pw (the product of the trailing width of the air bearing surface of the pole-tip 1B and $t_{shield\_1}$) to (the area of the air bearing surface of the main magnetic pole pole-tip 1B). In other words, it is the ratio of two opposed areas, namely, the main magnetic pole pole-tip 1B to the trailing shield 32. At around 1 on the horizontal axis, the magnetic field of reverse polarity (negative magnetic field) disappears. At the same time, there is little decrease in the gradient of the magnetic field, which is a proof that the main magnetic pole and the shield are well in balance. Accordingly, by adopting the structure as represented by (($Pw \times t_{shield\_1}$)/(the area of the main magnetic pole pole-tip 1B)≦1), embodiments of the present invention may realize all the better the perpendicular magnetic recording head that enables prevention of deletion and reduction of any previously recorded magnetization data.

Also, in the structure of the above embodiment, the saturation magnetic flux density may as well be made smaller for the material composing the portion 3B where the film thickness of the trailing shield is thinner. By making the saturation magnetic flux density smaller, it becomes possible to suppress absorption of magnetic flux and thus to more strongly prevent generation of magnetic field of reverse polarity.

Figure 9:
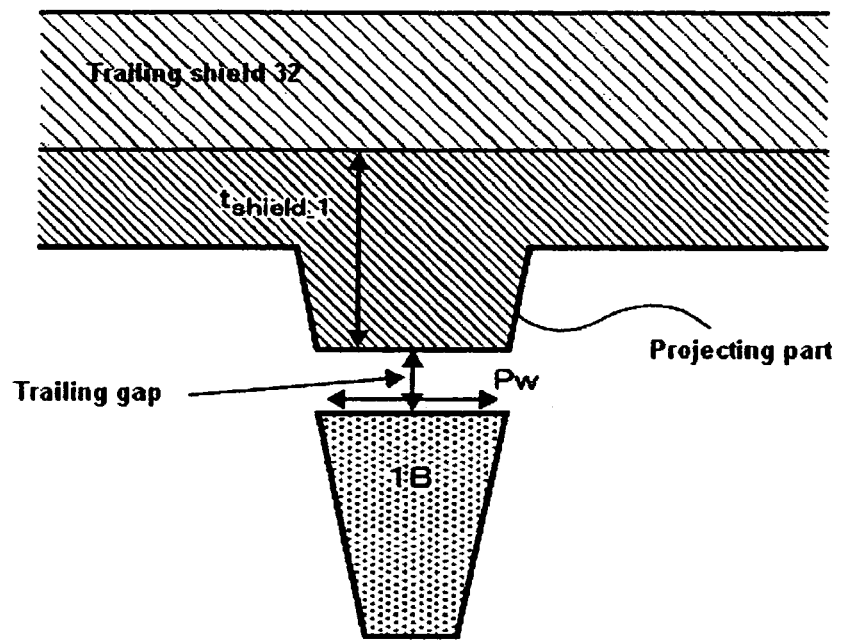
FIG. 9 is an exemplary schematic pattern diagram of the main magnetic pole and the trailing shield looked down from the ABS, showing an example of modification of the perpendicular magnetic recording head in relation to an embodiment.

Further, as shown in FIG. 9, the surface of the trailing shield 32 opposed to the main magnetic pole pole-tip 1B may not necessarily be made flat but may be configured so as to have a projecting part. But, if just the film thickness in the projecting part is varied, saturation might occur in the projecting part entailing deteriorated gradient in the magnetic field. In view of the foregoing, it is possible as shown in FIG. 9 that the film thickness should be made even both for the projecting part and for the portion extending in the direction of the track width; to put it another way, it is desirable that varying of film thickness should be made in the other places than the projecting part.

In the same light as above, the same configuration applied to the trailing shield 32 may as well be applied to the side shield 33 simultaneously or individually. This trial, if practiced, is also effective to realize the perpendicular magnetic recording head that allows prevention of deletion and reduction of any previously recorded magnetization data in the side shield position.

Figure 10:
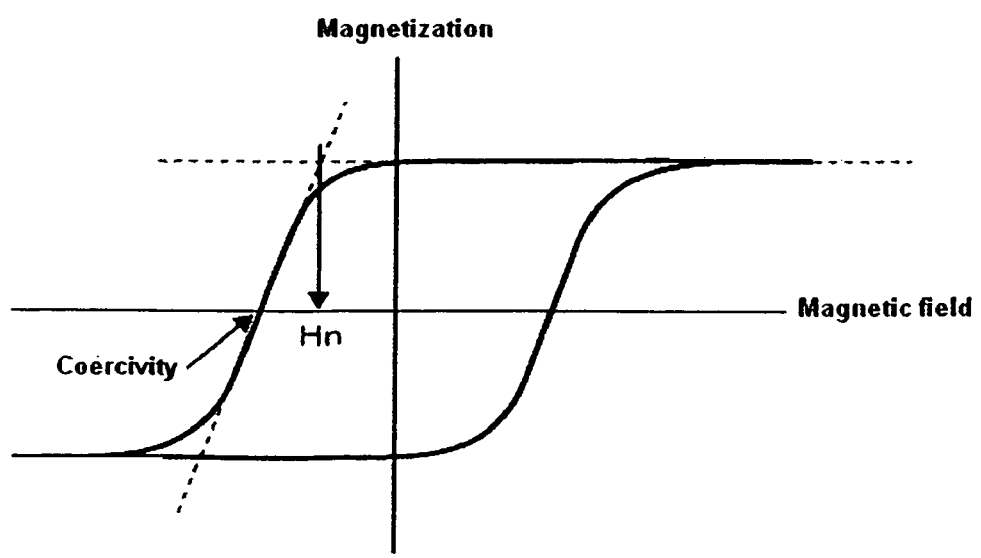
FIG. 10 is an exemplary schematic drawing showing the magnetization curves of the magnetic recording medium.

Magnetic field of reverse polarity may not be present at all, but may be permissible to some extent depending on the characteristic of the medium. FIG. 10 shows a schematic pattern diagram with respect to the magnetization curve of the medium. If the absolute value of the magnetic field is smaller than the absolute value of Hn of the medium, there occurs no change in magnetization, and it is conceived as possible to prevent deterioration and deletion of the recorded magnetization data. Therefore, configuration may as well be made up so that the absolute value of the magnetic field of reverse polarity may remain smaller than the absolute value of the Hn of the medium.

The configuration of the above embodiment is applicable without a problem to the case that a shield is provided also on the leading side of the main magnetic pole 1. Even if a magnetic field of reverse polarity is charged on the leading side, it does not exert an effect to the own track, but if a skew angle is caused, there is a possibility that the magnetic field may be charged to the adjacent track. Even in such a case, application of the aforesaid configuration may prevent deletion and reduction of any previously recorded magnetization data.

In the embodiment shown in FIG. 3, the auxiliary magnetic pole 3 is disposed on the leading side of the main magnetic pole 1. The auxiliary magnetic pole 3, however, may as well be disposed on the trailing side of the main magnetic pole 1 as shown in FIG. 11. When this configuration is taken, it brings forth the effect of enhancing the recording format efficiency in addition to the abovementioned effects of the embodiment, since the distance between the reproducing element 7 and the main magnetic pole 1 may be made very small.

Figure 12:
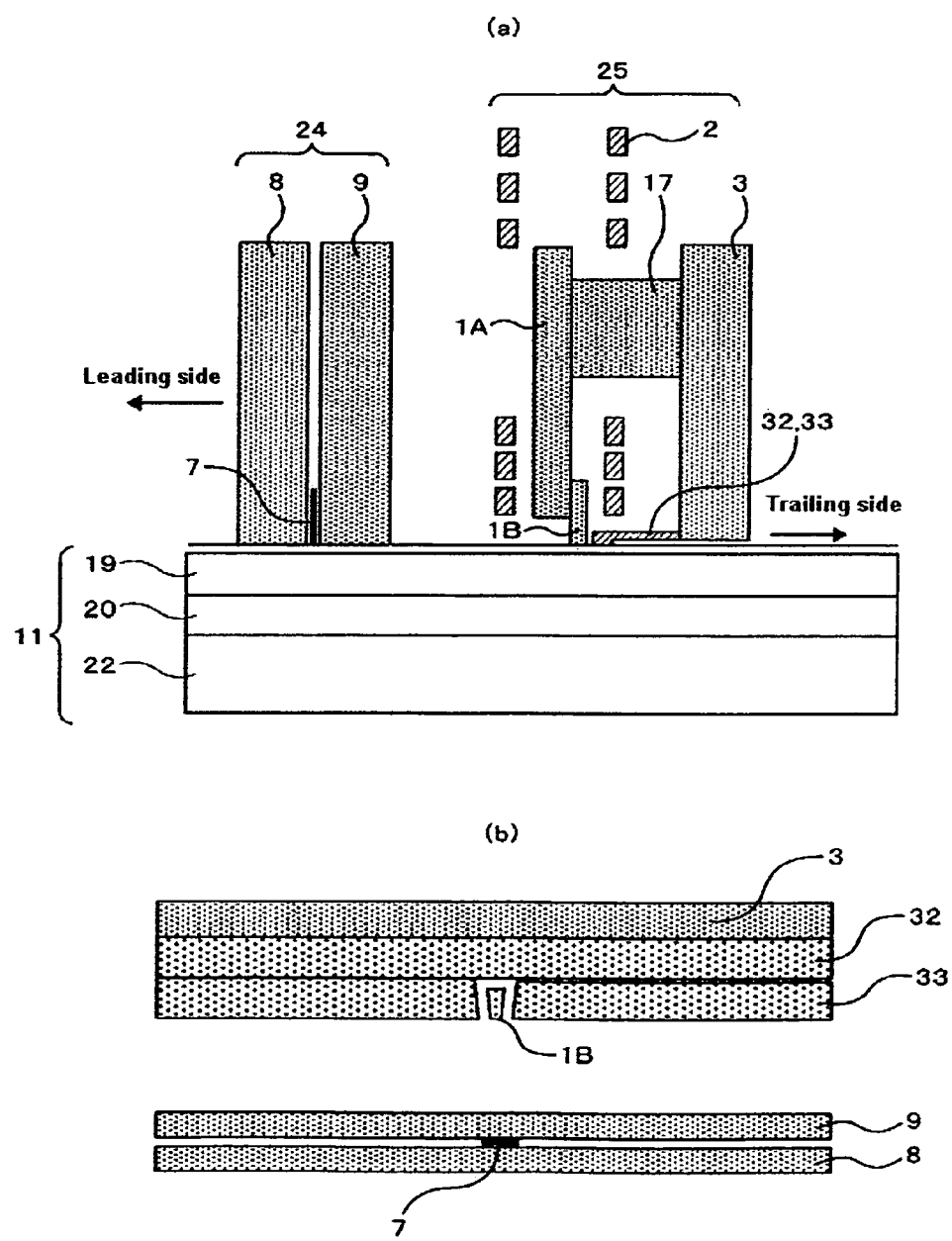
FIG. 12 includes (a) an exemplary cross-sectional schematic pattern diagram at the center of the track and (b) an exemplary schematic pattern top view looked down from the ABS, both showing an example of modification on the magnetic head shown in FIG. 3.

As shown in FIG. 12 in addition to the configuration in FIG. 11, the thin-film coil 2 may be provided not only on the trailing side but also on the leading side of the main magnetic pole 1. In this case, it becomes possible to enlarge the recording magnetic field of the main magnetic pole 1.

Also, as FIG. 13 shows, the auxiliary shield 10 may be placed between the reproducing head 24 and perpendicular magnetic recording head 25. The auxiliary shield 10 exhibits its effect of reducing intrusion of the magnetic field upon the reproducing element 7.

In the above embodiments, an ordinary magnetic disk with its magnetic recording layer 19 comprised of continuous magnetic film has been used for the magnetic disk medium 11. Without being limited to the above structure, the magnetic disk medium 11 may be made also by using a discrete track medium having a concavo-convex pattern running in the track direction, a bit-patterned medium having a concavo-convex pattern also in the bit direction, and so forth. In these cases, too, just as the above first case, it is possible to control the magnetic field intensity charged to the adjacent track and the adjacent bit and, therefore, to prevent deletion and reduction of the data in the adjacent track and the adjacent bit, thus permitting realization of a high-density magnetic disk device. Further, similar results are obtainable also in thermally assisted magnetic recording by any magnetic recording medium, if it has a concavo-convex pattern in the track direction to define the track and a concavo-convex pattern in the bit direction to define the recording bit.

Explanation has been given in the above with reference to certain embodiments, but the present invention is not limited to those particular embodiments. Those skilled in the art may easily make modifications, supplements, and/or alterations to each element of the above embodiments within the scope of the present invention. For instance, embodiment of the present invention may be applied to any magnetic recording devices other than those using HDDs and also to any such magnetic disk devices having magnetic heads that have only recording elements.

What is claimed is:

1. A perpendicular magnetic recording head comprising:
a main magnetic pole,
an auxiliary magnetic pole, and
a trailing shield of magnetic substance disposed on a trailing side of said main magnetic pole with a non-magnetic film in-between;
wherein said trailing shield has a first portion on the trailing side and a second portion facing the main magnetic pole, a thickness of the first portion in a height direction being less than a thickness of the second portion; and wherein
side shields of magnetic substance are provided, with non-magnetic film in-between, on both sides of said main magnetic pole in the direction of the track width, and the side shields have first portions thinned in the direction of the track width on a plane facing said main magnetic pole.

2. The perpendicular magnetic recording head according to claim 1, wherein said first portion is recessed from an air bearing surface (ABS) of said head.

3. The perpendicular magnetic recording head according to claim 1, wherein said first portion is recessed from the surface on a side opposite to an air bearing surface (ABS) of said head.

4. The perpendicular magnetic recording head according to claim 1, wherein the thickness of the first portion is 60% or less of the film thickness of the second portion.

5. The perpendicular magnetic recording head according to claim 1, wherein a product of a width of a plane of said trailing shield facing said main magnetic pole and a distance from said plane to the edge of the first portion, is equal to or less than an area of an air bearing surface (ABS) of said main magnetic pole.

6. The perpendicular magnetic recording head according to claim 1, wherein a saturation magnetic flux density in said first portion is smaller than a saturation magnetic flux density in said second portion.

7. The perpendicular magnetic recording head according to claim 1, wherein said trailing shield has a projecting part in said second portion.

8. The perpendicular magnetic recording head according to claim 1, further comprising:
   a leading shield of magnetic substance disposed on a leading side of said main magnetic pole with non-magnetic film placed in-between; wherein
   said leading shield has a first portion on a leading side and a second portion facing the main magnetic pole, a thickness in a height direction of the first portion being less than a thickness of the second portion.

9. The perpendicular magnetic recording head according to claim 1, wherein said auxiliary magnetic pole is disposed on a leading side of said main magnetic pole.

10. The perpendicular magnetic recording head according to claim 1, wherein said auxiliary magnetic pole is disposed on the trailing side of said main magnetic pole.

11. A magnetic head comprising:
   a perpendicular magnetic recording head including,
      a main magnetic pole,
      an auxiliary magnetic pole, and
      a trailing shield of magnetic substance disposed on the trailing side of said main magnetic pole with a non-magnetic film placed in-between,
      wherein said trailing shield has a first portion on the trailing side and a second portion facing the main magnetic pole, a thickness in a height direction of the first portion being less than a thickness of the second portion; and
   a reproducing head including,
      a magnetoresistance effect element disposed between a lower shield and an upper shield on a leading side of said perpendicular magnetic recording head; and
   the first portion is recessed from an air bearing surface (ABS) of the magnetic head; and
   side shields of magnetic substance with non-magnetic film in-between, on both sides of said main magnetic pole in a direction of the track width, and the side shields have first portions thinned in the direction of the track width on a plane facing said main magnetic pole.

12. The magnetic head according to claim 11, wherein said magnetoresistance effect element is either a giant magnetoresistance effect element or a tunnel magnetoresistance effect type element.

13. A magnetic disk device comprising:
   (i) a magnetic head, including,
      a perpendicular magnetic recording head including,
         a main magnetic pole,
         an auxiliary magnetic pole, and
         a trailing shield of magnetic substance disposed on a trailing side of said main magnetic pole with a non-magnetic film placed in-between, said trailing shield having a first portion on the trailing side and a second portion facing the main magnetic pole, a thickness in a height direction of the first portion being less than a thickness of the second portion; and
      a reproducing head including,
         a magnetoresistance effect element disposed between a lower shield and an upper shield on the leading side of said perpendicular magnetic recording head;
         a leading shield of magnetic substance disposed on a leading side of said main magnetic pole with non-magnetic film placed in-between; wherein
         the leading shield has a first portion on a leading side and a second portion facing the main magnetic pole, a thickness in a height direction of the first portion being less than a thickness of the second portion; and
   (ii) a magnetic disk including,
      a substrate,
      a lining layer of soft magnetism, placed above said substrate, and
      a magnetic recording layer, placed above said substrate.

14. The magnetic disk device according to claim 13, wherein said magnetoresistance effect element is either a giant magnetoresistance effect element or a tunnel magnetoresistance effect type element.

15. The magnetic disk device according to claim 13, wherein said first portion is recessed from an air bearing surface (ABS) of said head.

16. The magnetic disk device according to claim 13, wherein said first portion is recessed from the surface on a side opposite to an air bearing surface (ABS) of said head.

17. The magnetic head according to claim 11, further comprising:
   a leading shield of magnetic substance disposed on a leading side of said main magnetic pole with non-magnetic film placed in-between; wherein
   said leading shield has a first portion on a leading side and a second portion facing the main magnetic pole, a thickness in a height direction of the first portion being less than a thickness of the second portion.

18. The magnetic disk device according to claim 13, wherein side shields of magnetic substance are provided, with non-magnetic film in-between, on both sides of said main magnetic pole in the direction of the track width, and the side shields have first portions thinned in the direction of the track width on a plane facing said main magnetic pole.

* * * * *